United States Patent
Purdy

(10) Patent No.: US 7,693,753 B1
(45) Date of Patent: Apr. 6, 2010

(54) SYSTEM AND METHOD FOR PRESENTING ITEMS AND OBTAINING USER SELECTIONS OF THOSE ITEMS

(76) Inventor: Karen Purdy, 15460 Sherman Way, Suite 319, Van Nuys, CA (US) 91406

(*) Notice: Subject to any disclaimer, the term of this patent is extended or adjusted under 35 U.S.C. 154(b) by 863 days.

(21) Appl. No.: 10/062,826

(22) Filed: Jan. 31, 2002

(51) Int. Cl.
G06F 17/30 (2006.01)

(52) U.S. Cl. .......................................... 705/27; 705/26

(58) Field of Classification Search .............. 705/26–27
See application file for complete search history.

(56) References Cited

U.S. PATENT DOCUMENTS

| 5,799,157 A * | 8/1998 | Escallon ........................ 705/27 |
| 6,515,656 B1 * | 2/2003 | Wittenburg et al. .......... 345/302 |
| 2001/0049607 A1 * | 12/2001 | Tanaka et al. ................... 705/1 |

OTHER PUBLICATIONS

Schwartz, "Sharper Staples," Computerworld, Jun. 12, 2000, v34n24 p. 76-78, ISSN #00104841, Proquest.*
MVM: "My Virtual Model Launched by Public Technologies Multimedia," Business Wire, Nov. 16, 1998, Dialog file 20 #03453980.*
MVM: "Another Success for Public Technologies Multimedia Inc.: My Virtual Model in 3-D on the Galeries Lafayette Web Site," PR Newswire, Dec. 9, 1999, Dialog file 20 #08635071.*
WO 99/67700; Spiegel et al.; "Method and System for Electronic Commerce Using Multiple Roles," Dec. 29, 1999.*

* cited by examiner

Primary Examiner—Robert M. Pond
(74) Attorney, Agent, or Firm—Blakely, Sokoloff, Taylor & Zafman, LLP

(57) ABSTRACT

System and method for presenting items and obtaining user selections of those items. In one embodiment, the method comprises presenting a sequence of images of a plurality of items and adding a currently displayed item to a holding area responsive to accepting user input. In one embodiment, the presenting may be a virtual slide show. The method may be implemented as software on a stand-alone computer or in a client-server networked environment.

43 Claims, 10 Drawing Sheets

FIG. 5C

SYSTEM AND METHOD FOR PRESENTING ITEMS AND OBTAINING USER SELECTIONS OF THOSE ITEMS

FIELD OF THE INVENTION

The invention relates to stand alone computer software and client-server computer software to present multiple items sequentially to a consumer while allowing the consumer to select certain of those items during the presentation. More specifically, the invention relates to computer software which may be implemented on a stand alone computer or in a client-server configuration in which multiple items are sequentially presented to a consumer and a consumer is allowed to select certain of those items while the presentation continues, with or without interrupting the presentation.

BACKGROUND

As the Internet has evolved, many stores, shops, manufactures, wholesalers, retailers, etc. have constructed web sites to present items available from the particular entity. In this way, Internet web sites typically serve as catalogs of items available from a particular entity. For example, when a consumer views the content of a web site presented by a clothing retailer, the consumer is typically presented with an opportunity to select a particular group of items available from the retailer. In typical web sites, the groups of items listed are presented as departments or classes of the particular goods for sale. For example, men's, women's, shoes, outerwear, etc. When a consumer wishes to view the items in a particular department, the consumer may click on a particular graphic element or text string representing the grouping, thus causing the web site to present a screen full of thumbnail views of graphics of the particular goods in that department. However, for a consumer to view all of the items in a particular department the consumer is required to scroll through multiple screen pages of items in the department, to sequence through multiple web pages containing single items in the department, or to sequence through multiple pages containing smaller groups of items in the department, until all items have been viewed. Some web sites present all items in a department in one long web page, requiring the consumer to scroll through the long web page. When multiple items are presented in a single web page the consumer must click through a smaller image of an item to view a larger image of an item. As such, it is cumbersome for a consumer to view items presented on a retailer's web site.

BRIEF DESCRIPTION OF THE DRAWINGS

FIG. 5C illustrates an example screen shot of a selection window provided when a consumer adds an item to the consumer's shopping cart.

DETAILED DESCRIPTION

In various embodiments, the invention described herein allows a user such as a consumer to select one or more items while viewing multiple items presented in sequence, such as in a slide show or other sequential presentation of images. In one embodiment, the method may be implemented as software on a personal computer or other personal computing device. In another embodiment, the method may be implemented as client-server software that is based on a server computer which communicates with a consumer at a personal computer or other personal computing device.

Figure 1:
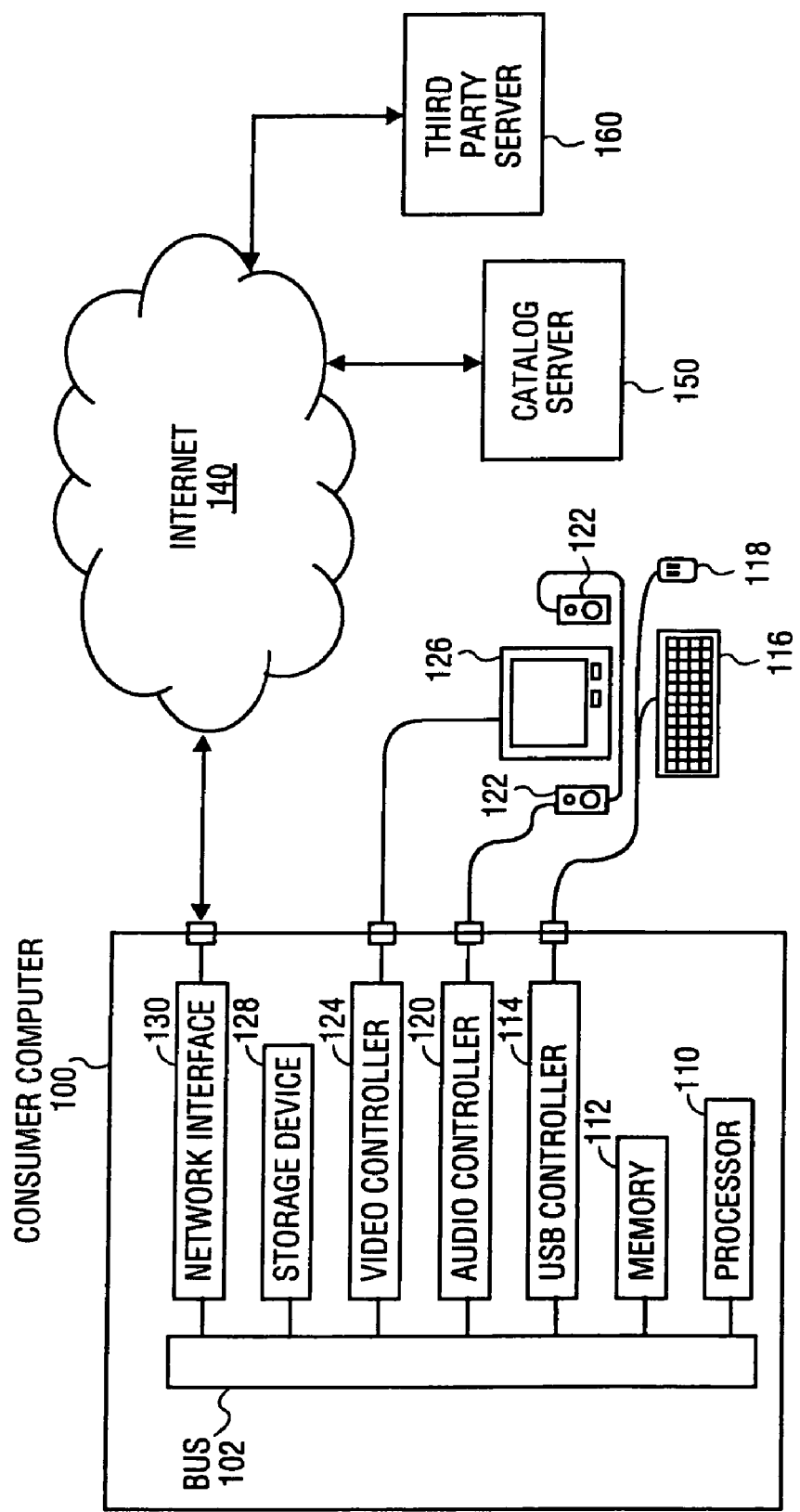
FIG. 1 illustrates an environment in which an embodiment of the invention may be implemented.

FIG. 1 illustrates an environment in which an embodiment of the invention may be implemented. In one embodiment, a user may access a personal computing device, such as personal computer 100 or other personal computing devices, including, for example, personal digital assistants (PDAs), cellular telephones, portable computers, laptop computers, computer workstations, computing tablets, and the like. In one embodiment, personal computer 100 includes processor 110 and memory 112. In one embodiment, software that executes the various embodiments of the invention described herein may be referred to as product presentation software (PPS) and may be executed by processor 110. Processor 110 may be any computer processor or microprocessor, and memory 112 may be any random access memory (RAM). User input may be received via Universal Serial Bus (USB) controller 114 to which user input devices such as keyboard 116, mouse 118, trackball (not shown), pen and tablet (not shown), etc. are connected. Audio may be presented to a user via audio controller 120 to which speakers 122 are connected. Graphics, images, video and text may be presented to a user by video controller 124 to which display 126 is coupled. Network interface 130 may be an analog modem, a cable modem, a digital modem, a network interface card, and other network interface devices that allow for communication via a wide area network such as Internet 140.

In one embodiment, computer instructions in the form of software programs including the PPS may be stored on storage device 128. In another embodiment, computer software instructions including the PPS may be downloaded via Internet 140 through network interface 130 to consumer computer 100. In this embodiment, the instructions may be executed by processor 110 and stored in memory 112 and/or stored in storage device 128. In various embodiments, storage device 128 may be any machine readable medium, including magnetic storage devices such as hard disk drives and floppy disk drives, optical storage devices such as compact disk read-only memory (CD-ROM) and readable and writeable compact disk (CD-RW) devices, RAM, read-only memory (ROM), flash memory devices, stick memory devices, electronically erasable programmable read-only memory (EEPROM), and other silicon devices, each of which may be coupled locally, such as storage device 128, or may be accessible via electrical, optical, wireless, acoustic, and other means from a remote source, including via a network.

In one embodiment, each of processor 110, memory 112, USB controller 114, audio controller 120, video controller 124, storage device 128, and network interface 130 are coupled to bus 102, by which each of these devices may communicate to an with one another. In various embodiments, two or more buses may be included in personal computer 100. In addition, in various embodiments, two or more of each of the components of personal computer 100 may be included in personal computer 100.

In one embodiment, a consumer or other user of personal computer 100 may obtain information from a remote source by communicating over Internet 140 with a retail or other business entity, such as catalog server 150. In one embodiment, catalog server 150 has a configuration similar to consumer computer 100. In various embodiments, catalog server 150 may be any well known server computer, workstation and the like. In one embodiment, the catalog server may include two or more computers arranged as a cluster, group, local area network (LAN), subnetwork, or other organization of multiple computers. In addition, when comprised of multiple computers, catalog server 150 may include routers, hubs, firewalls, and other networking devices. In this embodiment, catalog server 150 may include multiple specialized servers such as, for example, graphics servers, transaction servers, applications servers, database servers, and the like. In one embodiment, catalog server 150 may rely on one or more third parties to provide graphics, video, audio, transaction processing, and/or other information and processing assistance over Internet 140, such as shown by third party server 160.

Figure 2:
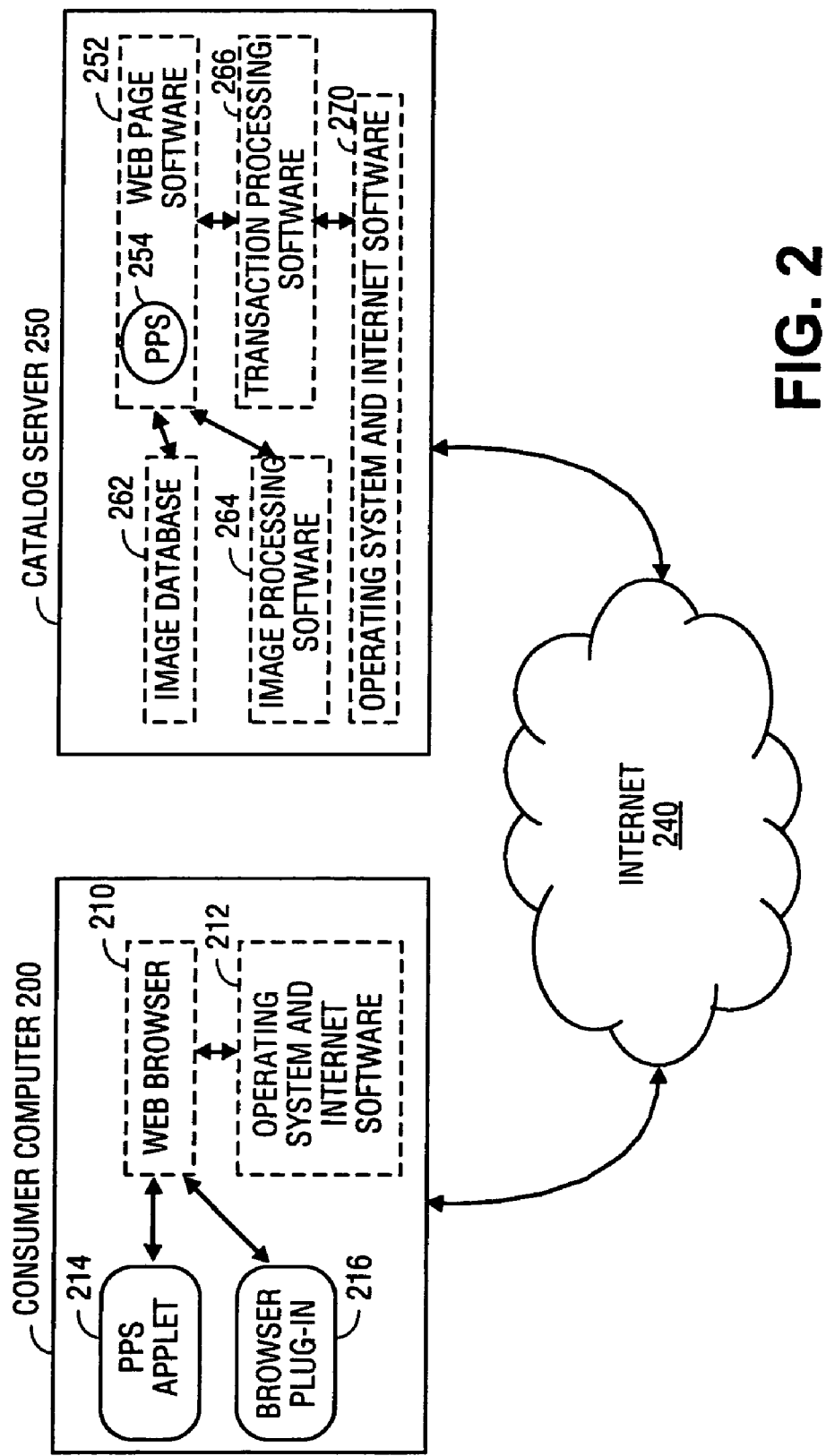
FIG. 2 illustrates a conceptual view of software involved with an embodiment of the invention described herein.

FIG. 2 illustrates a conceptual view of software involved with an embodiment of the invention described herein. In one embodiment, consumer computer 200 (a personal computer like personal computer 100) includes web browser 210, which may be any readily available software that allows for browsing the World Wide Web over the Internet. For example, web browser 210 may be Netscape Communicator Version 4.72 available from Netscape Communications Corporation of Mountain View, Calif. Web browser 210 provides support for communicating via the hyper-text transfer protocol (HTTP), and other popular high-level communications protocols, and may also provide support for the hyper-text markup language (HTML) and the extensible markup language (XML). Consumer computer 200 also includes operating system and Internet software 212 to support web browser 210. Various well known browser plug-ins 216 may be included to provide additional functionality to the web browser. In one embodiment, the operating system may be Windows XP, available from Microsoft Corporation of Redmond, Wash. The Internet software may be included as part of the operating system, and may provide support for popular Internet communications protocols, such as, the user datagram protocol (UDP), the transmission connect protocol (TCP), the Internet protocol (IP), etc. Consumer computer 200 may communicate over Internet 240 with catalog server 250.

In one embodiment, catalog server 250 includes web server software 252 to provide web pages to a consumer over Internet 240 at consumer computer 200. In one embodiment, PPS server software 254 may be included with web server software 252. Web server software 252 and PPS 254 may access an image database 262 and/or image processing software 264 to obtain images to be presented as part of web pages to a consumer at consumer computer 200. In one embodiment, the PPS server software 254 may communicate a PPS applet 214 to consumer computer 200 such that the PPS applet and PPS server software manage presentation of the slide show described herein in coordination with one another. Catalog server 250 may also include transaction processing software 266 that allows for the receipt of credit card information and/or other payment support. In another embodiment, the tasks required of the transaction processing software may be achieved by a third party web site that provides transaction processing assistance to the catalog server. The web page software and the other software within catalog server 250 are supported by an operating system which contains Internet software, depicted as operating system and Internet software 270. In various embodiments, the operating system may be Windows NT available from Microsoft Corporation of Redmond, Wash. In this embodiment, the operating system also includes support for Internet communication, including support for UDP, TCP, IP, and other popular Internet communications protocols.

Figure 3:
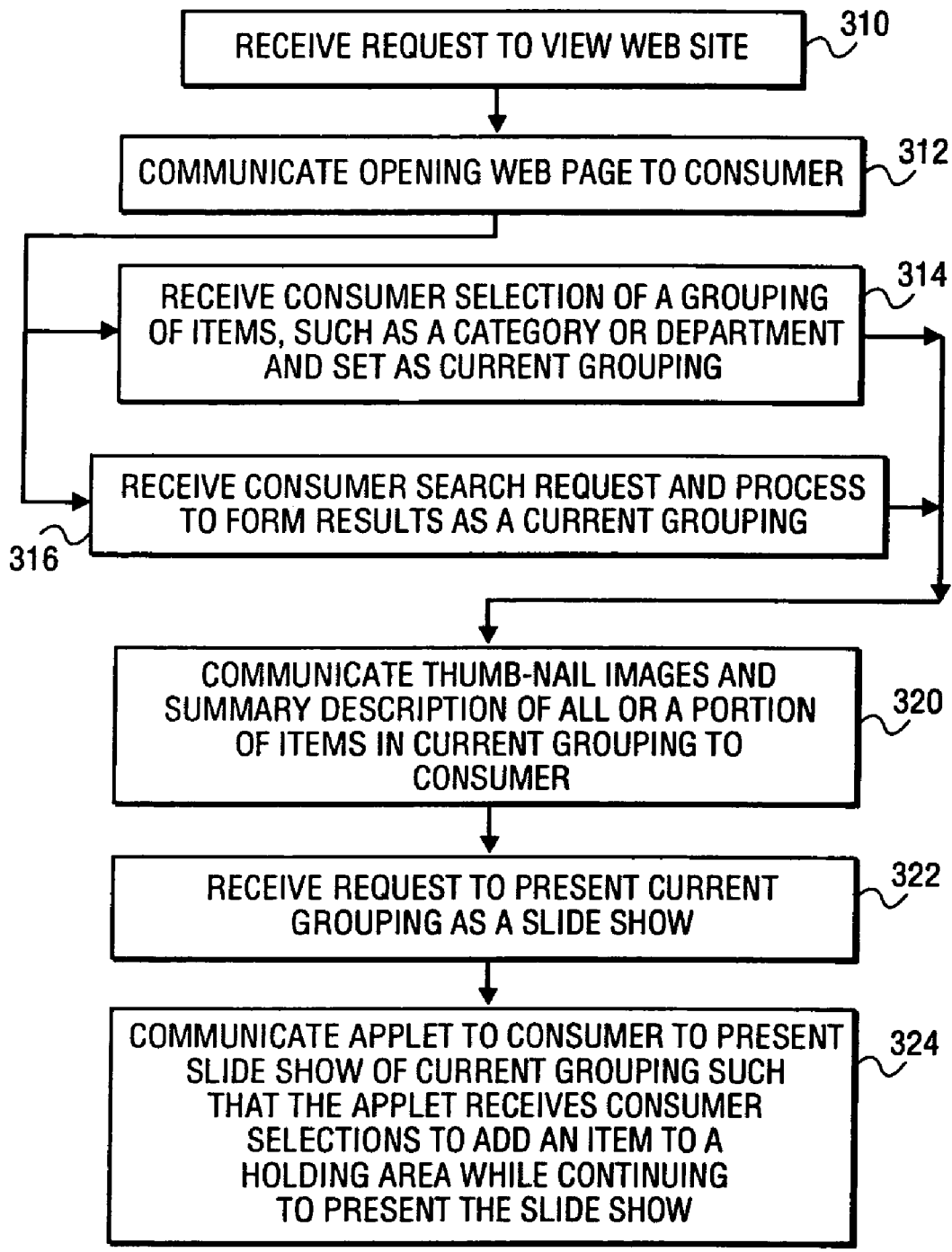
FIG. 3 illustrates a flow of actions according to one embodiment of the invention described herein.

FIG. 3 illustrates a flow of actions according to one embodiment of the invention described herein. In one embodiment, a catalog server may receive a request to view a web site originating from a consumer, as shown in block 310. The catalog server then communicates the opening web page for the web site to the consumer, a shown in block 312. In various embodiments, the opening web page may include a list of categories, departments, and other groupings of items which the consumer may then select to view. The catalog server may then receive a consumer's selection of a grouping of items, such as a category or a department, and set the particular selected category or department as a current grouping, as shown in block 314. In addition, the opening web page may provide an interface to a consumer to search all items available on the particular web site. In this embodiment, the catalog server may receive a consumer's search request and process the request according to well known methods to form a resulting list of items referred to as a current grouping, as shown in block 316. The catalog server may then communicate thumbnail images and a summary description of all or a portion of the items in the current grouping to the consumer, as shown in block 320. For example, if one of the selections is women's clothing, and the consumer selects women's clothing, a graphical display such as that illustrated in FIG. 5A may be presented to a consumer by the catalog server.

Figure 5A:
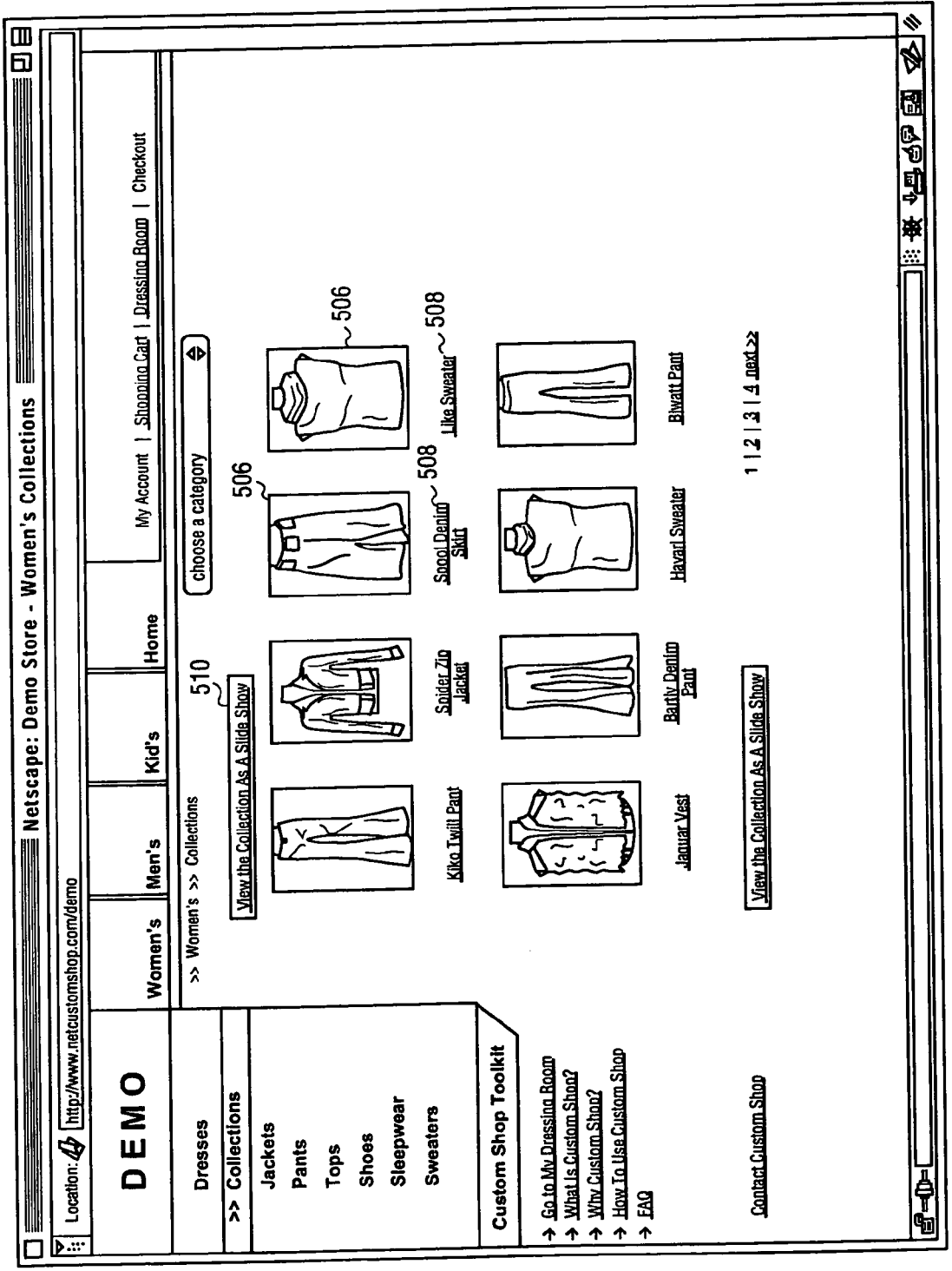
FIG. 5A illustrates a screen shot of an embodiment of a display of a grouping of items.

FIG. 5A illustrates a screen shot of an embodiment of a display of a grouping of items. In one embodiment, a well known display of thumbnail images 506 and short text descriptions 508 of items is presented to the consumer. Other information such as price, availability, and size may also be displayed accompanying the thumbnail images. In one embodiment, the display of the grouping of items as a thumbnail presentation may also include a user interface element that allows a consumer to select to view the grouping of items as a sequence of images displayed consecutively such that each image is displayed for a system defined time period. This sequential display is similar to a slide show and may be thought of in this embodiment as a virtual slide show. In one embodiment, the size of the images in the sequential display are optimized by the PPS for the consumer's screen size according to well known methods. In another embodiment, the size of the images in the sequential display are presented in a system defined default size which is larger than the thumbnail images and may be referred to as a full size image. Generally, user interface elements include text strings, icons, buttons, sliders, text entry fields, pull-down menus, walking menus, etc. More specifically, in one embodiment, the user interface element may be a text string such as text string 510 which may be clicked on or otherwise activated to invoke a sequential presentation of images, such as, for example, a slide show, according to the methods described herein. In another embodiment, the user interface element may be a graphical element which may be clicked on or otherwise activated by a consumer to invoke a slide show according to the methods described herein.

Continuing with the discussion of FIG. 3, the catalog server may receive a consumer request to present the current grouping as a slide show, as shown in block 322. The PPS server software on catalog server then communicates a PPS applet to the consumer's computer to present a sequence of images of the current grouping such as a slide show. The PPS applet may receive consumer selections to add an item to a holding area such as, for example, a wish list, a virtual dressing room, and/or a shopping cart while continuing to present the images without interruption, as shown in block 324. In one embodiment, the catalog server may communicate the PPS applet as a Java applet or other short computer software program from the server to the consumer computer. The PPS applet is then executed at the consumer's computer via, in one embodiment, the web browser.

In one embodiment, the sequence of images may be a slide show that includes a sequence of still images and associated text and/or graphics that is displayed consecutively until complete. The still images may be retrieved from an images server and communicated to the consumer's personal computer. The still images may be in any well known format, such as, for example, joint photographic experts group (JPEG) format, graphics interchange format (GIF), and the like. In one embodiment, the images may conform to a system defined resolution and have a system defined dimension. The system defined resolution may be, for example, 300 or 600 dots per inch (DPI), and the system defined dimensions may be, for example, 268 pixels by 350 pixels. In one embodiment, the slide show images may be in a format that requires a browser plug-in to be invoked to display the image. In one embodiment, the images may be played back with an accompanying soundtrack communicated from the catalog server to the consumer's personal computer. In this embodiment, the soundtrack may be in any well known audio format, such as, for example, wave audio format (WAV), Moving Pictures Expert Group audio layer 3 (MP3) format, and the like, which may be played by a browser plug-in or other software program on the consumer's personal computer.

Figure 4:
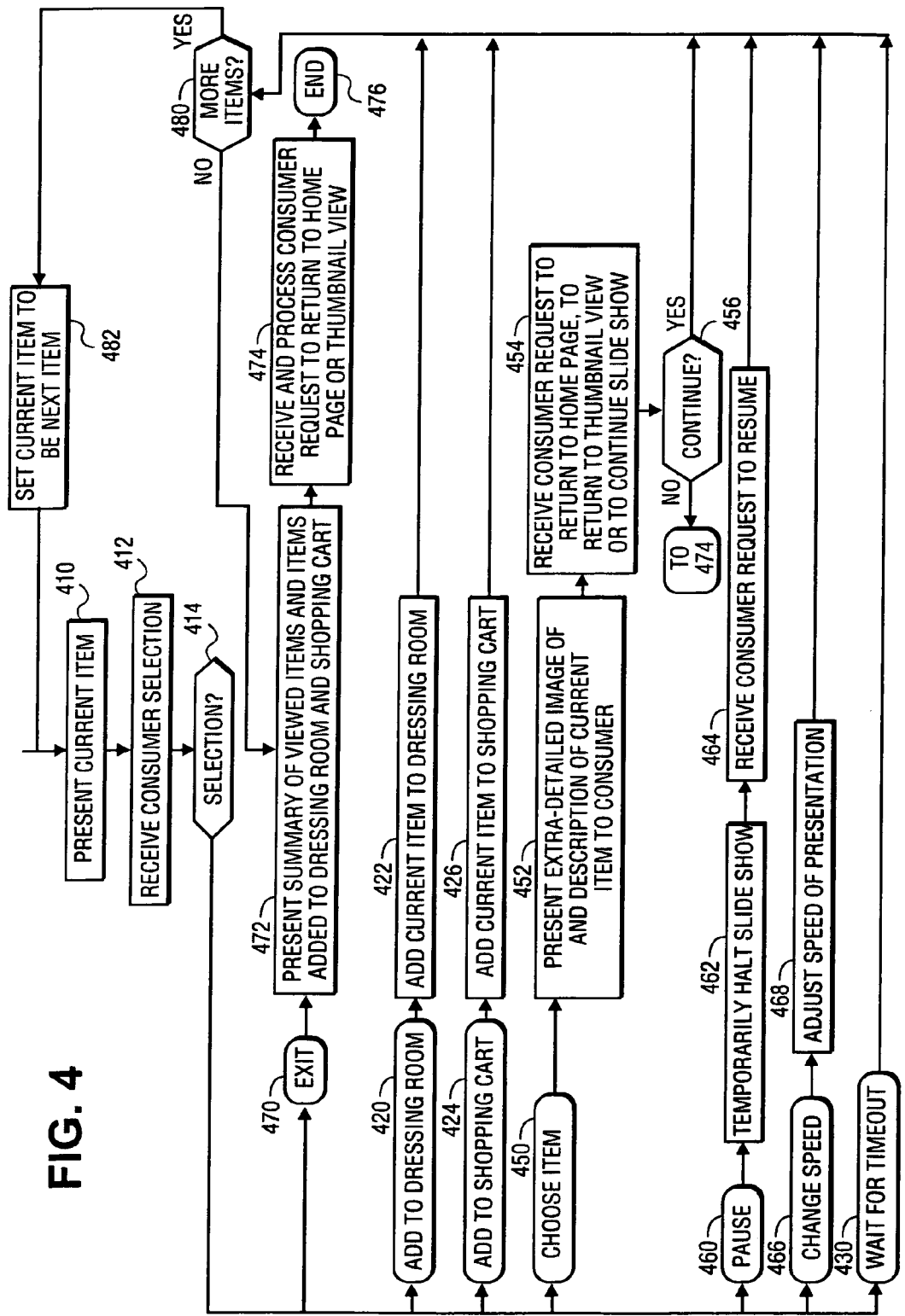
FIG. 4 illustrates a flow of actions taken according to a method for presenting a list of items while receiving consumer selection of one or more of the items.

FIG. 4 illustrates a flow of actions taken according to a method for presenting a list of items while receiving consumer selection of one or more of the items. In one embodiment, the PPS server software on the catalog server works in conjunction with the PPS applet on the consumer's personal computer to manage the presentation to a consumer of a current grouping of items. After a current grouping of items has been prepared by the web server software, the PPS server software in communication with the PPS applet may then present the current item to the consumer, as shown in block 410. The PPS applet then sequences through each of the items in the current grouping while also waiting to receive a consumer selection. In one embodiment, each of the items is presented to the consumer for a system defined time period such as, for example, three seconds, five seconds, eight seconds, etc. After the PPS applet receives a consumer selection, as shown in block 412, the action of the PPS applet then depends on what kind of selection was made by the consumer. In one embodiment, when the PPS applet presents the items as a slide show, each image is presented accompanied by user interface elements which a user may activate.

Figure 5B:
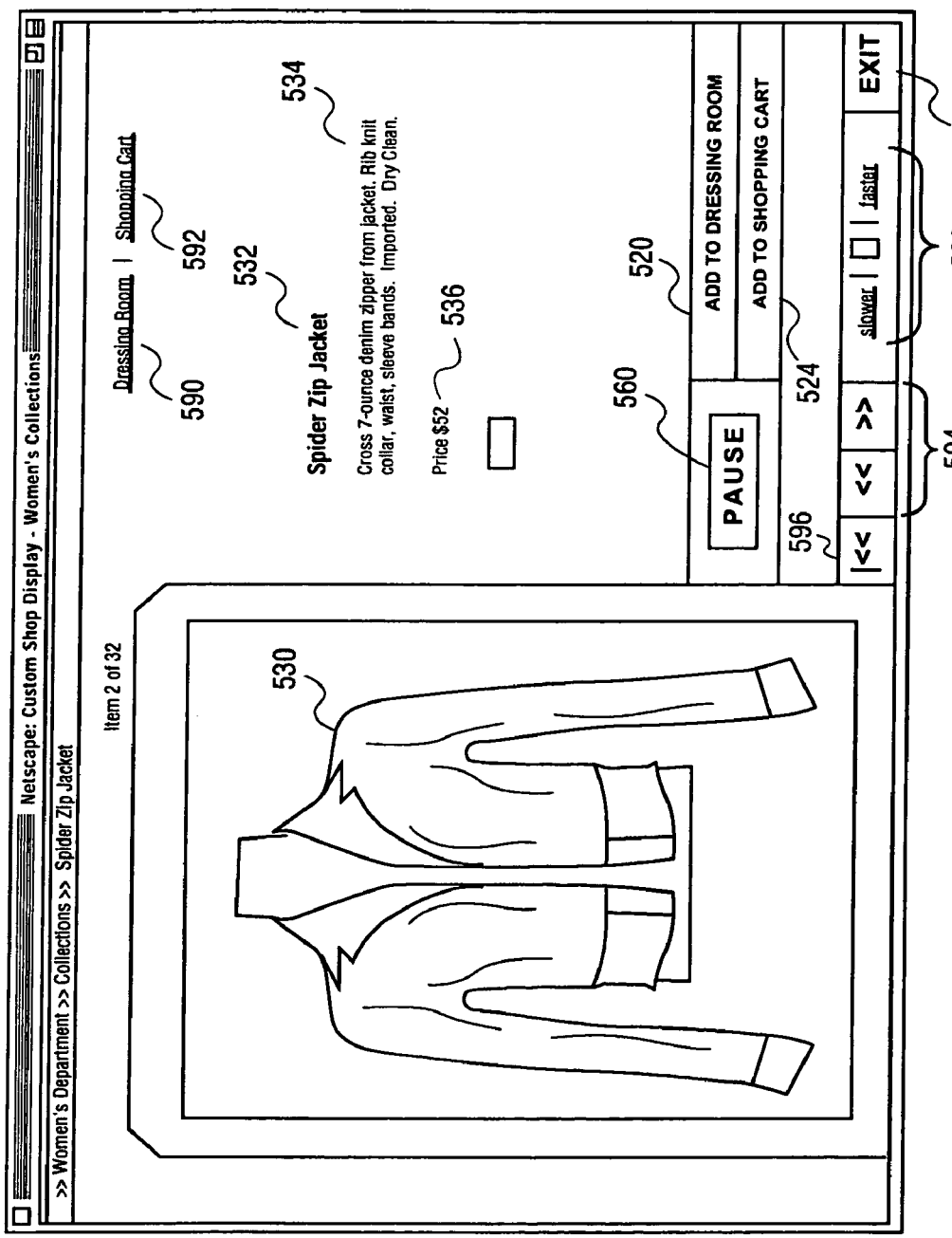
FIG. 5B illustrates an example screen shot of an item displayed according to an embodiment of the invention described herein.

FIG. 5B illustrates an example of an item displayed according to an embodiment of the invention described herein. In this embodiment, each item of a current grouping is presented in sequence along with a variety of user interface elements. In one embodiment, each item is presented as a graphic image 530 and associated text. In one embodiment, the associated text may include a general description 532, a detailed description 534, and a price 536. Other information such as size, availability, etc. may also be provided. In one embodiment, the user interface elements allow a consumer to select whether to add the current item to a dressing room, as shown by element 520; add a current item to a shopping cart, as shown by element 524; pause the presentation, as shown by element 560; adjust the speed of the presentation, as shown by element 566; change the direction of the presentation, as shown by element 594; return to the beginning of the presentation, as shown by element 596; and exit the presentation, as shown by element 570. In addition, the user interface elements may allow a consumer to view the contents of the dressing room, as shown by element 590; and view the contents of the shopping cart, as shown by element 592. In one embodiment, when the consumer requests to view the content of a holding area such as the shopping cart or dressing room, the PPS applet may either automatically or in response to a consumer's request allow the consumer to view the contents of the holding area as a slide show as described herein.

Referring again to FIG. 4, the PPS applet, alone or in conjunction with the PPS server software, while waiting for the current item's presentation to time out, as shown in block 430, takes whatever action is necessary to process a consumer's selection received while waiting for the current item to time out. When the PPS applet receives a consumer's selection to add the current item to a dressing room, as shown in block 420, the PPS applet then adds the current item to the dressing room, as shown in block 422. In one embodiment, this may involve communicating with the PPS server software to update a consumer dressing room database on the catalog server. In another embodiment, this may involve the PPS applet updating a local listing of the consumer's dressing room on the consumer's personal computer. When the PPS applet receives a consumer's selection to add a current item to the shopping cart, as shown in block 424, the PPS applet may add the current item to the shopping cart, as shown in block 426. This may be achieved in a similar manner as adding the current item to the dressing room, that is, by adding the current item to a consumer's shopping cart database on the catalog server. In another embodiment, the PPS applet on the consumer's personal computer may update a consumer's shopping cart list maintained locally on the consumer's personal computer. In one embodiment, this may be achieved by using cookies associated with a web browser. In one embodiment, no selection window is provided so that the slide presentation is not interrupted and proceeds continuously when a consumer adds an item to the consumer's shopping cart. After a consumer selects to add an item to the consumer's dressing room or to the consumer's shopping cart, the consumer is returned to the presentation of the slide show at the point where the slide show exited. As such, the flow of execution continues at block 480, such that the PPS applet checks to see if there are additional items in the current grouping. If so, the PPS applet sets the current item to be the next item in the current grouping, as shown in block 482. Otherwise, the flow of execution continues at block 472, which is discussed below.

Figure 5C:
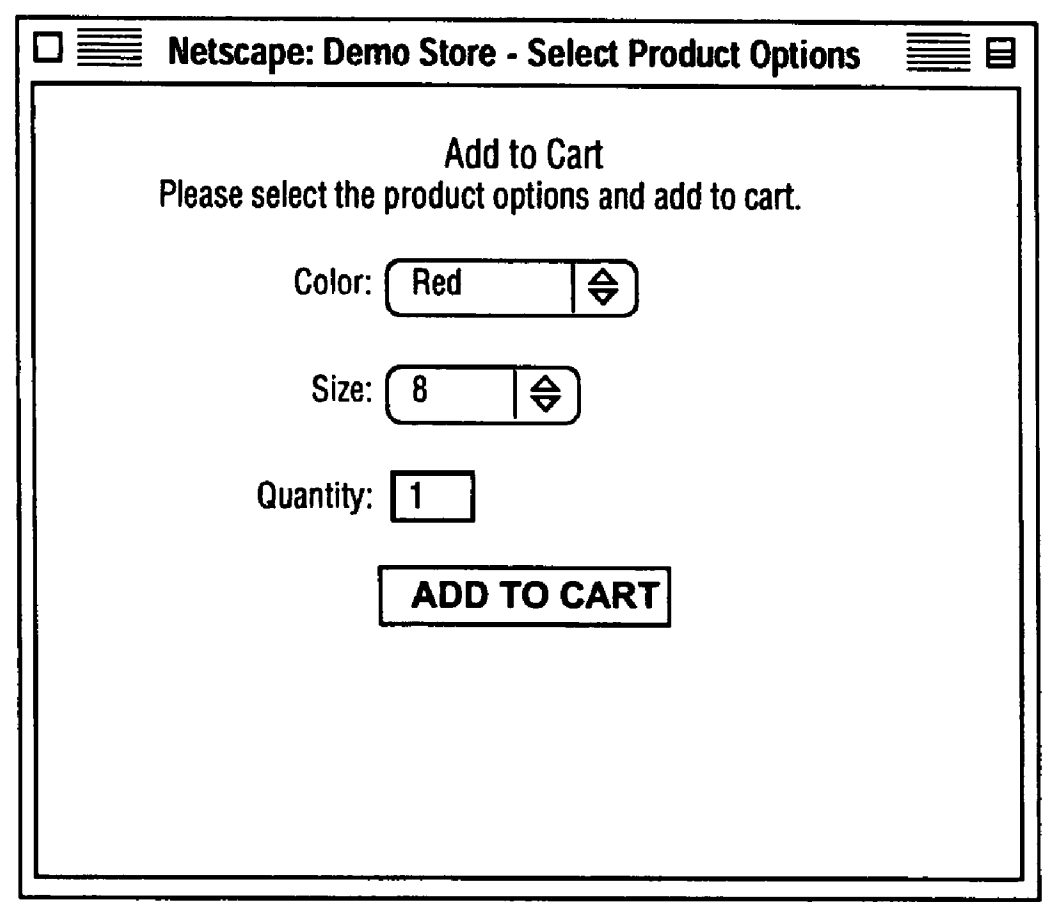
Figure 5D:
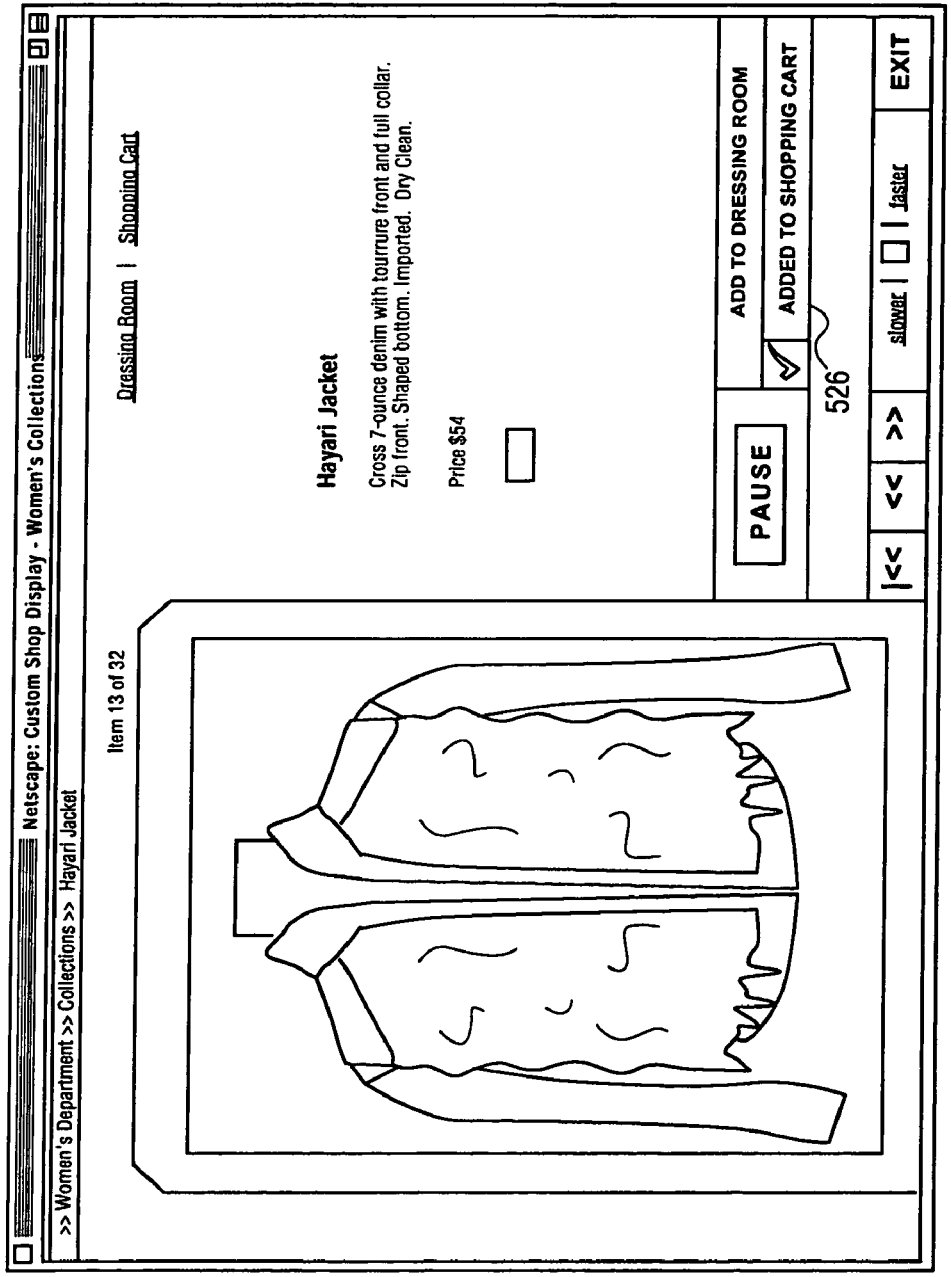
FIG. 5D illustrates an example screen shot of an item displayed indicating that the displayed item has been added to the consumer's shopping cart.
Figure 5E:
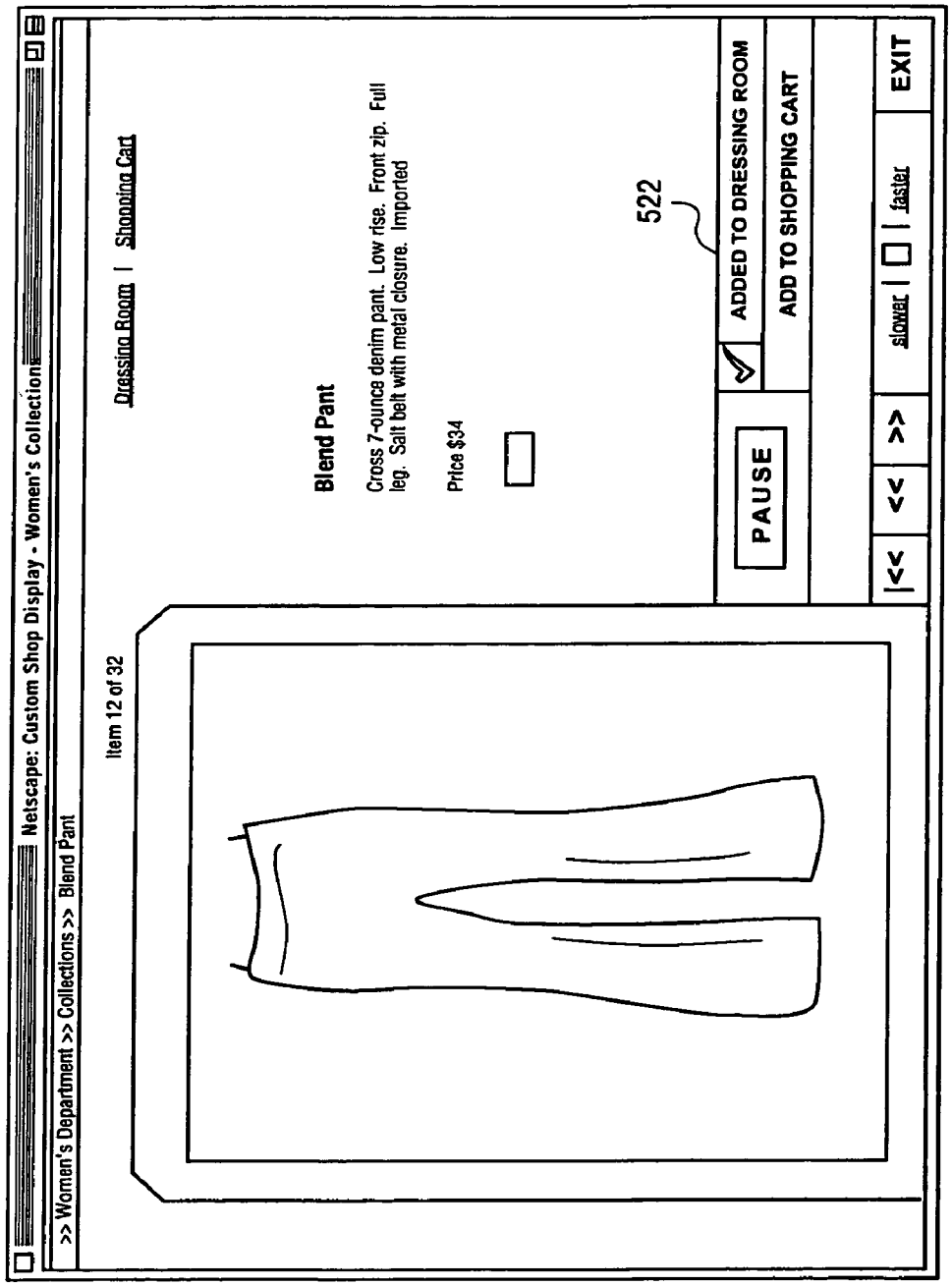
FIG. 5E illustrates an example screen shot of an item displayed indicating that the displayed item has been added to the consumer's dressing room.

In one embodiment, when a consumer selects to add the current item to a shopping cart, a selection window, such as shown in FIG. 5C is provided by the PPS applet to the consumer at the consumer's personal computer. The consumer can then select particular details regarding the selected item, such as, for example, size, color, etc., before the PPS adds the item to the consumer's shopping cart. After an item has been added to a consumer's shopping cart and the item is later viewed a second time and/or there is still time to view the item until the next item is ready to be viewed, the consumer's screen is updated to indicate that the particular item has been added to the consumer's shopping cart, as shown by element 526 in FIG. 5D. Similarly, after a consumer has selected to add a current item to the consumer's dressing room, the PPS applet may update the consumer's display to indicate that the current item has been added to the consumer's dressing room, such as by element 522 in FIG. 5E. The dressing room, shopping cart or other holding area may be viewed by a consumer at any time by activating an appropriate user interface element. Items may be deleted from any of the holding areas and may also be transferred between the holding areas according to well known techniques. In one embodiment, when returning to viewing the presentation, the presentation continues with the item the consumer was viewing prior to selecting to view a holding area. In another embodiment, the consumer may be returned to the presenting of the current grouping at the next item after the item the consumer was viewing prior to selecting to view a holding area. In various embodiments, the contents of the holding areas may be maintained for a period of time by the PPS, such as until the end of the day, may be maintained by the PPS for viewing upon the consumer's next log in, may be deleted upon logging out or closing the browser, or any combination of these well known techniques.

When the PPS applet receives a consumer's selection to choose an item for more detailed viewing, as shown in block 450, the PPS applet presents an enhanced or extra detailed image of the current item to the consumer, as shown in block 452. The enhanced image may be accompanied by and/or include descriptive text. In one embodiment, the enhanced image may just be a larger version of the same image having increased size and/or resolution. In another embodiment, if the item is an article of clothing, the enhanced image may allow for viewing the item on a virtual body and/or viewing the item in different available colors or patterns. In one embodiment, an enhanced version of the item may be a virtual reality or three-dimensional (3D) view of the item, such as, for example, a sequence of images created by well known methods including the methods available via Internet Pictures Corporation's iPIX program and Apple Computer Corporation's QuickTime VR program. This enhanced viewing of the image may be achieved by the automatic invocation of the appropriate web browser plug-in according to well known methods. After the enhanced image and description are provided, the PPS applet may in various embodiments provide a user interface to the consumer to allow the consumer to achieve one or more of: returning to the home page of the catalog server; returning to the thumbnail view of all of the current group of items; and/or to continue the slide show at the point where the slide show exited to present the enhanced image, as shown in block 454. If the consumer selects to continue with the slide show, as shown in block 456, the flow of execution continues at block 480 and a check is made to determine whether there are more items in the current grouping. If so, the current item is set to be the next item of the current grouping appearing in the sequence of images after the item that was selected for enhanced viewing, as shown in block 482. Otherwise, execution continues at block 472, discussed below.

The PPS applet may receive a consumer selection requesting that the speed of the slide show be changed, as shown in block 466. Upon receipt of such a selection, the PPS applet adjusts the speed of the presentation, as shown in block 468. Execution then continues at block 480, as discussed herein. If the PPS applet receives a consumer selection to pause the current slide show, as shown in block 460, the PPS applet temporarily halts the slide show, as shown in block 462, until receiving a consumer request to resume, as shown in block 464. In one embodiment, when the slide show is paused, additional details about the currently displayed item may be presented according to well known methods, including a text box that may allow for scrolling. In one embodiment, when the slide show is paused, all of the user interface elements remain active such that the current item may be chosen for more detailed viewing, the current item may be added to a holding area, etc. In another embodiment, an enhanced view of the currently displayed item may automatically be presented when the slide show is paused. Upon receiving a consumer request to resume, execution continues at block 480, as discussed herein. In one embodiment, any activation of any user interface element provided to the consumer may be interpreted as a consumer request to resume the presentation.

Figure 5F:
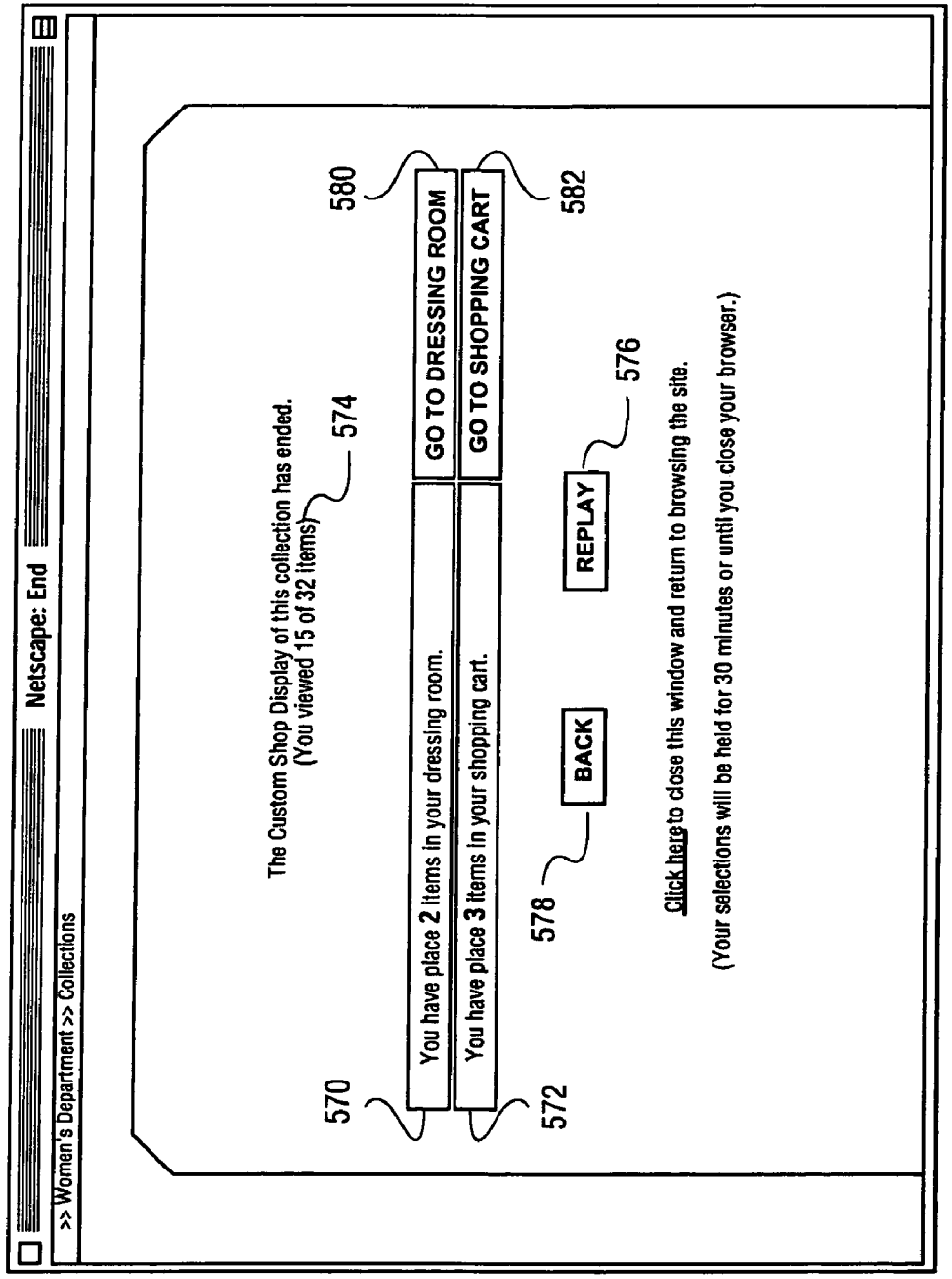
FIG. 5F illustrates an example screen shot of a summary window provided to a consumer upon exiting the slide show described herein.

If while viewing the current presentation, a consumer elects to exit, the PPS applet receives the consumer's selection to exit the slide show, as shown in block 470. The PPS applet then presents a summary window containing, in one embodiment, a summary of viewed items and items added to the dressing room and to the shopping cart, as shown in block 472. Block 472 may also be reached when the current grouping of items has been exhausted as evaluated at block 480. FIG. 5F illustrates a screen shot of a summary window provided to a consumer upon exiting the presentation described herein. In one embodiment, the PPS applet or the PPS server software may provide to the consumer the number of items the consumer has placed in the dressing room while viewing the slide show, as represented by element 570. Via the summary window, the PPS applet may also provide the consumer the number of items the consumer has placed in the consumer's shopping cart while viewing the slide show, as shown by element 572. The PPS applet provided summary window may also provide a tally of the number of items viewed of the particular grouping of items presented in the slide show, as shown by element 574. Referring again to FIG. 4, after presenting the summary window to the consumer, the PPS applet may then receive a consumer request to return to the catalog server's home page, or to return to the thumbnail view, as shown in block 474. This will end execution of this presentation of the current slide show, as shown in block 476. Referring again to FIG. 5F, the summary window may include a user interface element that allows a consumer to return to viewing a slide show of the current grouping at the item in the current grouping that was being presented when the slide show exited, if appropriate, as shown by element 578. In another embodiment, the user interface element may allow a consumer to return to viewing a slide show of the current grouping at the next item in the current grouping after the item that was being presented when the slide show exited, if appropriate. The summary screen may also provide a user interface element to the consumer to allow the consumer to replay or restart the slide show from the first item, as shown by element 576. In addition, the summary window may also provide the consumer the opportunity to view the contents of holding areas such as the consumer's dressing room and the consumer's shopping cart, as shown by elements 580 and 582. In another embodiment, the summary window may allow the consumer to view the contents of holding areas such as, for example, a wish list, dressing room and/or shopping cart, as a virtual slide show. In one embodiment, the slide show viewing option may be provided to a consumer when the consumer is viewing any of the holding areas as a list at any time, not only at the end of a presentation. In this embodiment, the current grouping is defined by the holding area such that the PPS presents the items from the holding area sequentially as discussed herein.

Referring again to FIG. 4, both when the PPS applet does not receive a consumer's selection while presenting the current item, and after a particular consumer selection has been processed, the PPS applet will evaluate whether the time for display of the current item has expired or timed out, as shown in block 430. If the system defined time period to present the item has expired, the PPS applet then evaluates whether there are any more items in the current grouping of items to be presented to the consumer, as shown in block 480. If there are additional items in the current grouping to be presented to the consumer, the next item is then retrieved. In one embodiment, the PPS applet in conjunction with the PPS server software retrieves the images and data for the next item from the image database and, in one embodiment, a catalog database within the catalog server. In another embodiment, the PPS server software may anticipatorially serve a number of images and corresponding descriptions to the consumer's personal computer such that when a next item is required, it is already available on the storage device and/or within the memory of the consumer's personal computer. The current item is then set to be the next item, as shown in block 482. The flow of execution then continues at block 410. If there are no more items to present to the consumer in the current grouping, as shown in block 480, the flow of execution continues at block 472 where a summary window may then be presented to the consumer, as discussed above.

In another embodiment, the sequentially presented images may be in the form of a video stream. In this embodiment, the video stream may be in any well known format, including, for example, the Moving Pictures Expert Group (MPEG) format, RealMedia format, Quicktime VR format, and the like. As discussed above, the video stream may be communicated by the catalog server and displayed via a browser plug-in. The video stream may include timing information so that when a consumer clicks on or otherwise selects an image frame, a product shown in the image is placed in the consumer's shopping cart, dressing room, wish list or other consumer holding area. To achieve this, a list or database containing timing information and corresponding products shown during the image frame associated with the timing information is accessed. In this way, a video stream of models walking down runways may be presented to a consumer, the models wearing clothing meeting consumer specified search request requirements or representing a grouping of clothing. Then, when a user selects a frame, a clothing product displayed in the frame is identified by referring to a time entry in a list or database. The products are then added to a consumer holding area for later consumer access.

In a related embodiment, if a model is wearing more than one clothing product, only the product meeting the search requirements or grouping earlier selected by the consumer is added to the consumer holding area. In this way, the search requirements or grouping may be thought of as filtering all of the products contained in the selected image frame. In yet another embodiment, the PPS may pause the presentation to display a list of all products included in the selected frame. The consumer may then select which of the products, if any, the consumer wishes to have added to the consumer holding area. The list of products may include a product name, department, model number or other identifier, description information such as materials used in the products and price. After a selection of products is made from the list, the presentation of images continues.

In another embodiment, the PPS may exist as a single stand-alone program distributed via a storage medium such as a CD-ROM or other machine readable medium. In this embodiment, the PPS combines the functionality of the PPS applet and the PPS server software into a single program or group of programs. In this embodiment the images, text and user interface elements may be stored on the CD-ROM and retrieved as needed to accomplish the methods described above locally on a personal computer or other personal computing device.

In another embodiment, the PPS may be used to display images in any context such that the PPS is not limited to either clothing, women's clothing or retail storefronts. The PPS may be used to display or present any group of images and allow for selection of certain images to be added to a list or database of selected items while a slide show of the image is displayed in an uninterrupted fashion. That is, the PPS is not limited to a shopping cart, wish list, or virtual dressing room, but may store selected items in a group, list or database while the slide show is uninterruptably presented. The PPS may be useful in various contexts, including a manufacturer or wholesaler presenting products to distributors or retailers, an Internet auction, presentation of available inventory of any kind, including automobile parts, cars, trucks, works of art, homes, office space, or any product, part, item whether retail, wholesale, commercial, industrial, etc.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed:

1. A method comprising:
   receiving from a user over a network a request to view a presentation of a plurality of images depicting a plurality of items;
   retrieving the plurality of images from a graphics database on a storage device where each image includes a pictorial representation of at least one of the plurality of items;
   presenting each of the plurality of images in sequence to the user via a display of a personal computing device;
   receiving a user selection of a currently displayed image of the plurality of images during the presentation;
   placing an item associated with the currently displayed image in a holding area database responsive to receiving the user selection; and
   presenting each image of each of the items of the plurality of items in the holding area database in sequence to the user via the personal computing device wherein absent user input the presenting of the sequence in the holding area continues uninterrupted.

2. The method of claim 1 wherein the holding area database is at least one of a shopping cart, a dressing room, and a wish list.

3. The method of claim 1 further comprising:
   presenting a summary of all those items in the holding area database to the user via the display upon cessation of the presenting.

4. The method of claim 1 wherein the presenting is paused responsive to the receiving of the user selection.

5. The method of claim 4 wherein the presenting resumes with a next image of the plurality of images occurring after the currently displayed image.

6. The method of claim 4 wherein the presenting resumes with the currently displayed image.

7. The method of claim 1 further comprising:
receiving a user selection to view the contents of the holding area database.

8. The method of claim 1 wherein when the presenting each image of each of the items of the plurality of items in the holding area database concludes, the presenting each of the plurality of images in sequence continues with one of a most recently displayed image or a next image after the most recently displayed image.

9. The method of claim 1 wherein the presenting comprises:
providing a user interface that allows the user to control the presenting, the user interface allowing the user to achieve at least one of changing the direction of the presenting, restarting the presenting, selecting the currently displayed image for more detailed viewing, and pausing the presenting.

10. A method comprising:
receiving from a user over a network a request to view a presentation of a plurality of images depicting a plurality of items;
retrieving the plurality of images from a graphics database on a storage device where each image includes a pictorial representation of at least one of the plurality of items;
presenting each of the plurality of images in sequence to the user via a display of a personal computing device;
receiving a user selection of a currently displayed image of the plurality of images during the presentation;
placing an item associated with the currently displayed image in a holding area database responsive to receiving the user selection;
presenting each image of each of the items of the plurality of items in the holding area database in sequence to the user via the personal computing device; and
wherein the presenting is not interrupted by the receiving of the user selection.

11. A system comprising:
a processor coupled to a bus;
a memory coupled to the bus,
a storage device coupled to the bus, the storage device including instructions stored thereon which when executed by the processor cause the processor to perform operations comprising:
receiving from a user over a network a request to view a presentation of a plurality of images depicting a plurality of items;
retrieving the plurality of images from a graphics database on the storage device where each image includes a pictorial representation of at least one of the plurality of items;
presenting each of the plurality of images in sequence to the user via a display of a personal computing device wherein absent user input the presenting of the sequence continues uninterrupted;
receiving a user selection of a currently displayed image of the plurality of images during the presentation;
placing an item associated with the currently displayed image in a holding area database responsive to receiving the user selection; and
presenting a summary of all those items in each of a plurality of holding areas residing in the holding area database to the user via the display upon cessation of the presenting.

12. The system of claim 11 wherein the holding areas include at least one of a shopping cart, a dressing room, and a wish list.

13. The system of claim 11 wherein the presenting is not interrupted by the receiving of the user selection.

14. The system of claim 11 wherein the presenting is paused responsive to the receiving of the user selection to process the placing.

15. The system of claim 14 wherein the presenting resumes with a next image of the plurality of images occurring after the currently displayed image after the placing has been achieved.

16. The system of claim 14 wherein the presenting resumes with the currently displayed image after the placing has been achieved.

17. A method comprising:
sourcing a plurality of images of items for sale over a computer network;
presenting a sequence of the images depicting the plurality of items as a first virtual slide show on an electronic display;
adding a currently displayed item to a holding area database remote from the display during the presenting responsive to accepting user input; and
providing a user interface to allow the user to select to view the contents of the holding area as a second virtual slide show on the electronic display; and
presenting the second virtual slideshow of the contents of the holding area uninterrupted absent user input.

18. The method of claim 17 wherein the sequence of images is a sequence of still images.

19. The method of claim 18 wherein each still image is augmented by text associated with the item depicted in the still image.

20. The method of claim 19 wherein the text includes at least one of a price and an item description.

21. The method of claim 17 wherein the presenting comprises:
providing a user interface to allow a user to modify the speed of the presenting.

22. The method of claim 17 wherein the presenting comprises:
providing a user interface to allow a user to add the currently displayed item to the holding area.

23. The method of claim 17 wherein the holding area is at least one of a wish list, a virtual shopping cart, and a virtual dressing room.

24. The method of claim 17 further comprising:
displaying an enhanced version of the currently displayed item responsive to a user request.

25. The method of claim 17 wherein the presenting is a virtual slide show.

26. The method of claim 17 wherein the adding pauses the presenting.

27. The method of claim 26 wherein the presenting resumes with a next image of a next item of the plurality of items occurring after the currently displayed item.

28. The method of claim 26 wherein the presenting resumes with the currently displayed item.

29. The method of claim 17 wherein the presenting comprises:
displaying each image of the sequence of images for a system defined period of time.

30. The method of claim 29 wherein the displaying comprises:
providing a user interface to allow a user to modify the system defined period of time.

31. A machine readable medium having instructions stored thereon which when executed by a processor cause the processor to perform operations comprising:
- sourcing a plurality of images of items for sale over a computer network;
- presenting a sequence of the images depicting the plurality of items as a first virtual slide show; and
- adding a currently displayed item to a holding area database remote from the display during the presenting responsive to accepting user input; and
- providing a user interface to allow the user to select to view the contents of the holding area as a second virtual slide show; and
- presenting the second virtual slideshow of the contents of the holding area uninterrupted absent user input.

32. The machine readable medium of claim 31 wherein the sequence of images is a sequence of still images.

33. The machine readable medium of claim 31 wherein each still image is augmented by text associated with the item depicted in the still image.

34. The machine readable medium of claim 31 wherein the presenting comprises:
- providing a user interface to allow a user to modify the speed of the presenting.

35. The machine readable medium of claim 31 wherein the presenting comprises:
- providing a user interface to allow a user to add the currently displayed item to the holding area.

36. The machine readable medium of claim 31 wherein the holding area is at least one of a wish list, a shopping cart, and a virtual dressing room.

37. The machine readable medium of claim 31 wherein the adding pauses the presenting.

38. The machine readable medium of claim 37 wherein the presenting resumes with a next image of a next item of the plurality of items occurring after the currently displayed item.

39. The machine readable medium of claim 37 wherein the presenting resumes with the currently displayed item.

40. The machine readable medium of claim 31 wherein the adding is achieved without interrupting the presenting.

41. The machine readable medium of claim 31 wherein the presenting comprises:
- displaying each image of the sequence of images for a system defined period of time.

42. The machine readable medium of claim 41 wherein the displaying comprises:
- providing a user interface to allow a user to modify the system defined period of time.

43. A method comprising:
- presenting a sequence of images depicting a plurality of items as a first virtual slide show on an electronic display;
- adding a currently displayed item to a holding area database remote from the display during the presenting responsive to accepting user input without interrupting the presenting; and
- providing a user interface to allow the user to select to view the contents of the holding area as a second virtual slide show on the electronic display.

* * * * *